Jan. 22, 1952     H. K. WIESE     2,583,454
PRESSURE TITRATION
Filed July 12, 1946
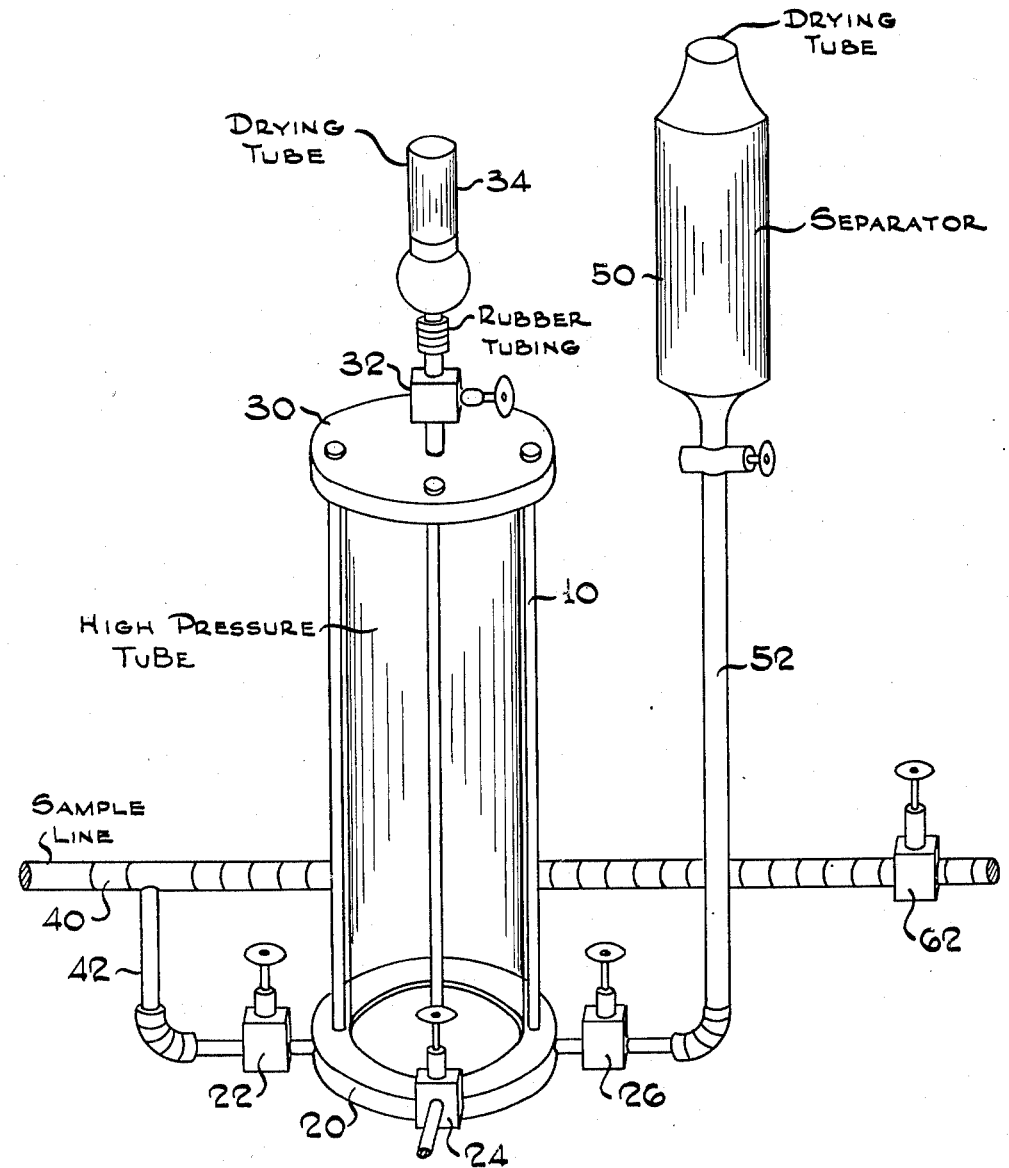
Herbert K. Wiese  Inventor
By J. C. Small  Attorney Patented Jan. 22, 1952

2,583,454

UNITED STATES PATENT OFFICE 2,583,454

PRESSURE TITRATION

Herbert K. Wiese, Cranford, N. J., assignor to Standard Oil Development Company, a corporation of Delaware Application July 12, 1946, Serial No. 683,051

3 Claims. (Cl. 23—230)

This invention relates to the titration under process conditions of liquid samples, and in particular to a process and apparatus for directly determining quantitatively contaminants in small quantities in liquid industrial samples.

In many industrial processes, the presence of contaminating substances adversely affects the processing. When the contaminants are present in extremely small quantities and the taking of a sample presents some difficulty, such as from lines containing normally gaseous hydrocarbons under pressure and high temperatures, significant opportunities for contamination in the sample are present and added complications often occur in the handling of the sample prior to testing. Under such conditions, quantitative determination of contaminating substances under operating conditions is often very important but difficult. The present invention is a means by which the presence of contaminants developing during the processing may be readily determined and avoidance assured in this manner of prior art difficulties.

In the present invention, a tube suitable for volume graduation is usually held between two flanges so as to provide a desirable fluid-tight titration vessel under the expected testing conditions. The vessel may be constructed of calibrated glass of thickness and reinforcing materials so as to resist pressures, or mainly of metal with a calibrated sight glass. The vessel is fitted at the bottom with three valves usually accommodated in the lower flange element. One of the valves is connected to a supply of reagent, another to the process line for obtaining the sample directly, and the third for discarding the analyzed sample. The top of the vessel, usually through the flange, contains one valve for venting purposes.

The device is usually manipulated by allowing a quantity of reagent into the graduated reaction vessel and then allowing the sample to enter the reaction vessel under the line pressure but usually cooled to about atmospheric temperature in passing through the lines. The sample is added to the titration vessel until the desired titration reaction has been obtained. The quantities of sample and reagent are noted. Evaluation in this manner of the amount of contaminants present in the sample is so obtained directly from the processing line. The device may also be utilized by passing the reagent into a measured quantity of the sample until the desired reaction, usually marked by an indicator, has occurred.

As an illustration of the invention, a specific embodiment is described and illustrated. The apparatus in this embodiment as illustrated in the drawing consists of 120 cc. tube 10 capable of withstanding a vapor pressure of about 100 pounds per square inch. This tube is placed between two stainless steel flanges 20 and 30 so as to make fluid-tight connections with the tube. The lower flange 20 contains three stainless steel valves 22, 24 and 26. The upper flange contains a stainless steel needle valve 32. The valve 22 is connected by copper tubing 42 to the process line 40. The valve 24 functions as a flushing line for discarding sample from the vessel. The valve 26 is connected by flexible—usually neoprene—tubing 52 to a supply 50 of reagent. The valve 32 in the upper flange is usually connected by flexible tubing, usually rubber, to a drying tube 34. Usually, for personal safety, a guard of heavy Lucite is placed around the tube 10. The valve 62 upon the process line 40 is used for flushing control. Usually several such valves as 62 are located on the process line 40 beyond the supply point in order to control satisfactorily the flushing of the lines from which the sample is obtained.

The use of this apparatus may be conveniently illustrated in its application to the determination of water in non-aqueous liquids. For the determination of small quantities of water in such cases, the reaction between sulfur dioxide and iodine as expressed by the following chemical equation may be employed:

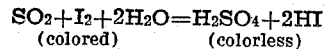
$$SO_2 + I_2 + 2H_2O = H_2SO_4 + 2HI$$
(colored)         (colorless)

No reaction occurs under anhydrous conditions. The reagent, comprising iodine and sulfur dioxide dissolved in a mixture of pyridine and methanol, is generally employed. This reagent is intensely colored and thus serves as its own indicator when utilized in titration procedures. A known amount of the reagent is added through line 52 to the titration vessel 10 followed by the addition of the process sample through line 42 at about ordinary temperatures until the mixture has become essentially colorless. Color changes due to dilution are not important due to the great intensity of color.

Thus, in the determination of water in several synthetic methyl chloride samples containing not more than 0.02% by weight, standardized reagent was added to the reaction vessel to the 10 mm. calibration mark. This sample was then discarded and another 10 mm. sample of reagent added. The upper valve 32 was then closed and a liquefied sample from the process line was allowed to enter rapidly. Usually, when mixing is desired, a slight release of pressure is permitted by opening the valve 32 slightly so as to cause the liquid mixture to boil slightly. The following results were obtained:

| Wt. Per Cent Water by Synthesis | Wt. Per Cent Water Found |
|---|---|
| 0.0045 | 0.0042, 0.0043 |
| 0.0066 | 0.0064, 0.0058 |
| 0.0087 | 0.0087, 0.0084, 0.0092, 0.0090 |
| 0.0130 | 0.0132, 0.0136, 0.0136 |

In analyzing a sample of methyl chloride from a butyl rubber plant, comparison of results obtained by other methods gives the following tabulation:

| Method Employed | Increment Found |
|---|---|
| Titration Directly of Vapor Sample | 0.008 |
| Titration of Vapor Sample Employing Intermediate Sampling Container | 0.000 |
| Method of the Invention | 0.009 |

Comparison of these data indicate the accuracy of the method of the invention and the convenience in obviating the titration directly of the large volume of the vapor sample. Furthermore, the accuracy of this method is dependable since the common discrepancies arising in the conventional methods employed due to withdrawing samples from the plant into suitable containers, and thence transportation to the laboratory for analysis, are obviated. Moisture in the air varies not only from day to day but during the day, thus necessitating "blank" determinations to be made for accuracy with each analysis. According to the method of the invention, these sources of discrepancies are eliminated with an accompanying increased accuracy and saving in titrating time. Also, with the older methods, it is practically impossible to evacuate completely containers for the transportation of samples without leaving sufficient amounts of water vapor in the container, particularly as an absorbed film on the sides of metallic containers and in the connecting lines.

The means for determining quantitatively contaminants in liquid stream samples under process conditions thus may be applied directly in the plant by direct connection to the plant main. The speed of determination arises mainly because (1) intermediate sampling vessels are avoided; (2) no particular cooling of the sample is required, and (3) no evaporation of the sample is involved. Furthermore, in the handling of normally gaseous samples liquid under process conditions, simplicity of treatment is attained coupled with compactness of the equipment as a result of the sample being taken in the liquid condition. The method of the invention may be applied by proper choice of techniques to a wide variety of substances, including hydrogen chloride, sulfur dioxide, carboxylic acid, unsaturated hydrocarbons such as isobutylene and isoprene, alcohols, ethers, esters and alkyl halides. Water in various solid substances may also be determined by the means of this invention.

What is claimed is:

1. A method of titrating a liquefied normally gaseous material to quantitatively determine water contamination thereof consisting of the steps of feeding into the titration zone a measured quantity of a colored reagent which is rendered colorless when reacted with a sufficient quantity of water, sealing said zone, thereafter admitting a measured quantity of the normally gaseous material into said zone under superatmospheric pressure sufficient to maintain said material as a liquid in the titration zone and in just sufficient quantity to render said reagent colorless, whereby the quantity of water present in said gaseous material may be accurately known.

2. Process according to claim 1 in which the reagent is a mixture of sulfur dioxide and iodine.

3. Process according to claim 2 in which the normally gaseous material is methyl chloride.

HERBERT K. WIESE.

REFERENCES CITED

The following references are of record in the file of this patent:

UNITED STATES PATENTS

| Number | Name | Date |
|---|---|---|
| 862,870 | Schmitz | Aug. 6, 1907 |